United States Patent [11] 3,597,973

| [72] | Inventor | Francis E. Ryder |
| | | Lake Zurich, Ill. |
| [21] | Appl. No. | 855,928 |
| [22] | Filed | Sept. 8, 1969 |
| [45] | Patented | Aug. 10, 1971 |
| [73] | Assignee | Illinois Tool Works Inc. |
| | | Chicago, Ill. |

[54] COMBINED LEVEL INDICATOR AND HYDROMETER
9 Claims, 9 Drawing Figs.

[52] U.S. Cl. .................................................. 73/291, 73/447
[51] Int. Cl. ............................................ G01n 9/18, G01f 23/02
[50] Field of Search ............................................ 73/447– 451, 441, 32, 291, 327; 136/182.0, 182.3, 182.4

[56] References Cited
UNITED STATES PATENTS

| 829,460 | 8/1906 | Bunce | 73/440 |
| 1,424,730 | 8/1922 | Linebarger | 73/440 |
| 1,583,859 | 5/1926 | Sears | 73/444 X |
| 1,648,412 | 11/1927 | Linebarger | 136/182 (.5) X |
| 2,469,560 | 5/1949 | Jutte | 73/291 |
| 3,362,224 | 1/1968 | Melone | 73/327 |
| 3,417,614 | 12/1968 | Ryder | 73/327 |

*Primary Examiner*—Louis R. Prince
*Assistant Examiner*—Daniel M. Yasich
*Attorneys*—Olson, Trexler, Wolters and Bushnell, Robert W. Beart, Michael Kovac, Barry L. Clark and Jack R. Halvorsen ABSTRACT: The present invention relates generally to a combined liquid level indicator for indicating levels of liquid subject to fluctuation and hydrometer means for indicating the specific gravity of the liquid with the device adapted to be mounted in the upper wall of a liquid container, as for example the upper wall of a conventional storage battery. The embodiments of the invention disclosed in the present application include a visual liquid level indicating device having a reflecting surface at the inner end of a transparent body member and the upper end of the transparent body member is adapted to the concentrate light rays reflected from the inner end of the body member from different positions. The liquid level indicator is provided with a groove at its lower end and adapted to receive a pair of identical halves of the hollow body section of the hydrometer means. In another embodiment the hollow body section of the hydrometer means comprise two identical halves which are hinged together to accept a grooved indicator and having a female and male fastening means on the respective halves. The hydrometer means of the various embodiments are provided with chamber means and means for admitting liquid thereto and indicating ball float means operatively mounted within the chamber means for indicating the specific gravity of the liquid within which the hydrometer means is inserted. The different chamber means of the various embodiments comprise substantially parallel and inclined walls between which the indicating ball float means is operatively mounted for indicating the specific gravity of the liquid. When the liquid level of the battery or radiator with which the combined liquid level indicator and hydrometer means is utilized covers the end of the indicator one will obtain a normal black or dark pattern at the upper end. If the specific gravity is low, the orange or red colored ball will not float and will drop down and provide an indicia at the end of the indicator.

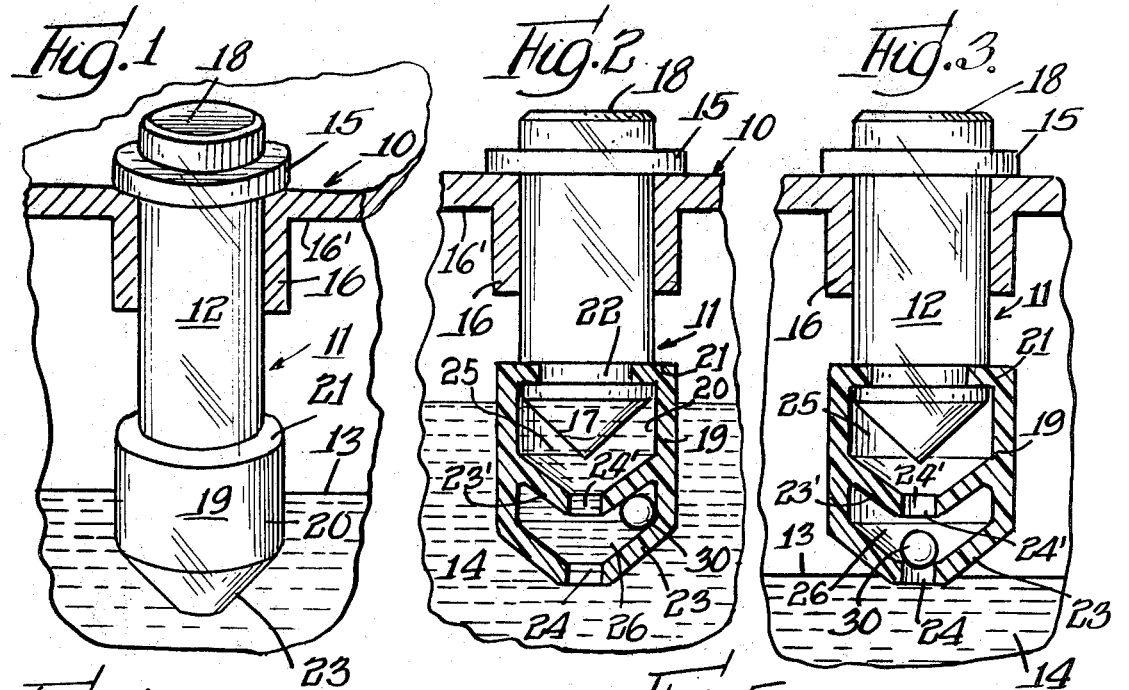
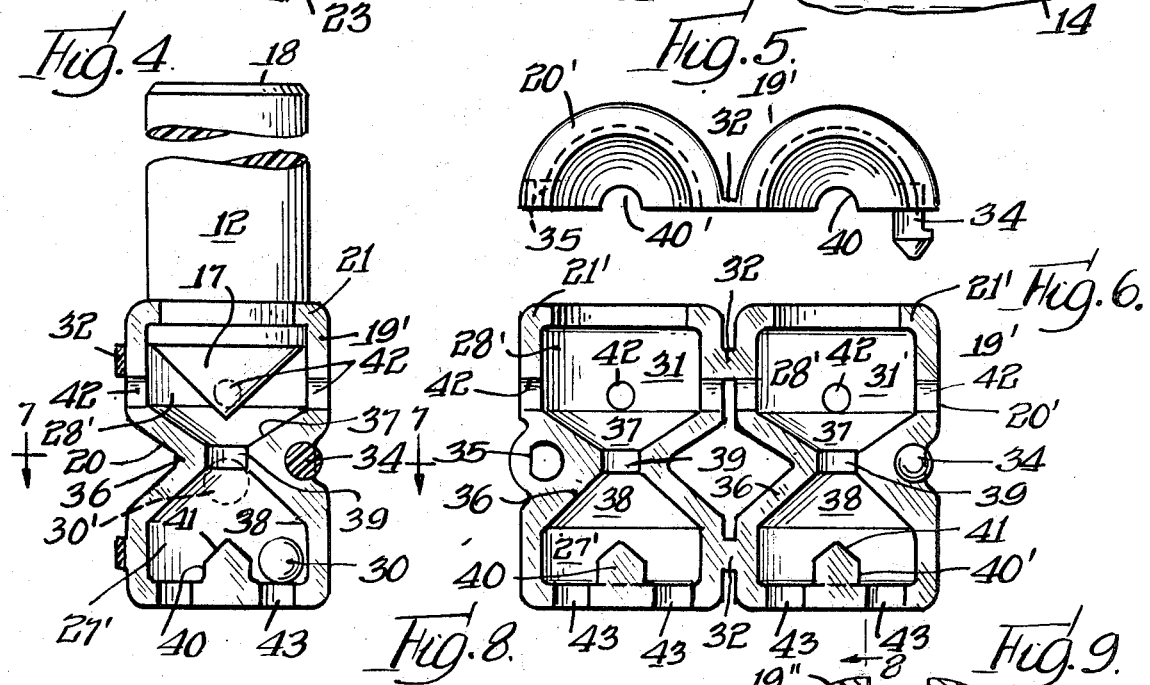
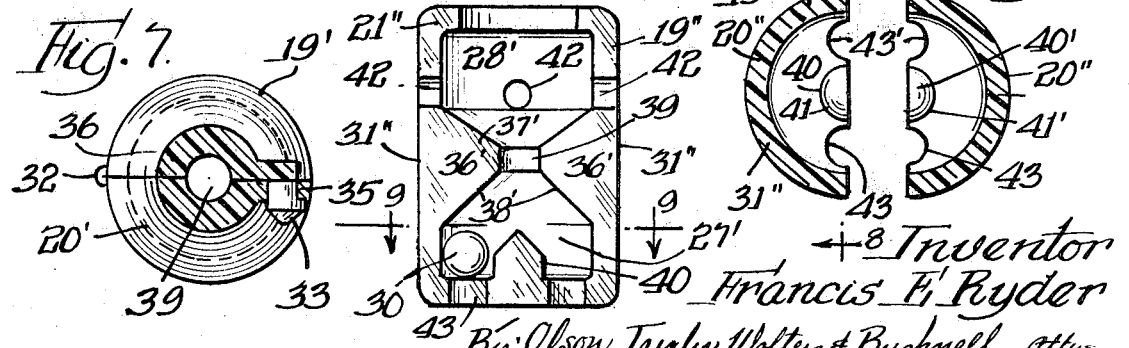

3,597,973

COMBINED LEVEL INDICATOR AND HYDROMETER

The present invention relates to a novel combined liquid level indicator for indicating levels of liquids subject to fluctuation and hydrometer means for indicating the specific gravity of the liquid, and more specifically relates to visually observable fluid level indicators and specific gravity devices.

It will become apparent that various uses for the combined liquid level indicator and specific gravity devices of the type contemplated herein may suggest themselves. However, to facilitate the present disclosure it is observed that it is frequently necessary to check the level of the electrolyte in storage batteries installed in vehicles or other places and it is also frequently necessary to check the level in the liquid in the cooling system of a vehicle. Likewise it is frequently necessary to check the specific gravity of the electrolyte in storage batteries, preferably at the same time as the liquid level is determined and similarly, to determine the specific gravity of the liquid in the cooling system wherein the coolant may be various forms of commercial anti-freezes. As is well known, the usual practice for checking the liquid level or specific gravity in either storage batteries or cooling systems contemplates the removal of the filling caps from the battery or from the radiator so as to permit a look inside. Various devices have heretofore been proposed for aiding the checking of the liquid level in batteries and radiators and the like, devices have also been suggested for checking the specific gravity of the electrolyte or coolant, but no heretofore proposed device capable of checking both liquid level and specific gravity has come into general use.

It is an important object of the present invention to provide a novel combined liquid level indicator and hydrometer means in the form of a specific gravity device which is of simple and economical construction and which is highly effective and easily readable.

A more specific object of the present invention is to provide a novel combined fluid level indicator and hydrometer means which may be readily assembled with storage batteries, radiators and the like for permitting the level of the fluid therein, as well as the specific gravity thereof, to be determined without removal of the battery or radiator cap.

Still another important object of the present invention is to provide a novel level indicator in conjunction with hydrometer means which comprises a member of light transmitting material adapted to be assembled with the battery, radiator or the like, and shaped so as to collect and concentrate rays of light and reflect such light at predetermined areas with a relatively high intensity when the liquid within the battery or radiator recedes so as to avoid contact with the member, intensity of the reflected light providing a readily observable indication of the liquid level.

Another object of the present invention is to provide a novel combined liquid level indicator and hydrometer means comprising a member of light transmitting material formed so as to present an area having an appearance of being relatively bright when the liquid falls below a predetermined level.

A further object of the present invention is to provide a novel combined fluid level indicator and specific gravity device of the above-described type which may be readily mounted in storage battery caps, radiator caps and the like.

Other objects and advantages of the present invention will become apparent from the following description and the accompanying drawing wherein:

FIG. 1 is a perspective view, partly in elevation and cross section, showing a container such as a storage battery or radiator utilizing a combined fluid level indicator and hydrometer incorporating features of the present invention;

FIG. 2 is a view in elevation, partly in cross section, of the hydrometer means affixed to the liquid level indicator and with the device immersed in liquid indicating a high specific gravity condition by the absence of the ball;

FIG. 3 is a view in elevation, partly in cross section, similar to FIG. 2 and illustrating the combined liquid level and hydrometer including indicating ball float means and the level indicator with a low level of the fluid within a container;

FIG. 4 is a view in elevation, partly in cross section, illustrating a combined liquid level indicator and hydrometer means, in which the hydrometer means is a modification in which the identical halves thereof are hinged together and formed with a male and female fastening means on the respective halves;

FIG. 5 is a plan view of the hydrometer means of FIG. 4;

FIG. 6 is a view in elevation of the hydrometer means of FIG. 4;

FIG. 7 is a view in partial section taken along line 7-7 of FIG. 4;

FIG. 8 is a view in elevation, taken along line 8-8 of FIG. 9, looking in the direction of the arrows, illustrating a modified form of hydrometer means formed from identical halves which may be affixed together with suitable adhesive; and FIG. 9 is a view taken along line 9-9 of FIG. 8, illustrating the symmetrical halves of FIG. 8 before being affixed together.

Referring now more specifically to the drawings wherein like parts are designated by the same numerals throughout the various figures, a storage battery, automotive radiator or other form of container 10 is shown in FIGS. 1, 2 and 3, which container utilizes a combined fluid level indicator and hydrometer means 11 for indicating level of the liquid subject to fluctuations and also the specific gravity of the liquid. It is within the scope of the invention that the liquid level indicator member 12 may take any one of the forms thereof as disclosed and claimed in U.S. Pat. No. 3,362,224 granted to Robert R. Melone on Jan. 9. 1968, and filed Dec. 28, 1964 for Liquid Level Indicator and assigned to Illinois Tool Works Inc., Chicago, Illinois, and likewise the Liquid Level Indicator of the copending application Ser. No. 797,141, filed Feb. 6, 1969, now U.S. Pat. No. 3,543,581, by Francis E. Ryder, and similarly assigned to Illinois Tool Works Inc.

Each indicator member 12 is constructed as will be described in detail below so that in use under various handicaps, it may be easily and accurately read.

As shown best in FIGS. 1—4, the fluid level indicator 12 comprises a member or rod formed from a light transmitting material such as an acrylic, glass, styrene or other clear or partially clear materials. The liquid level indicator 12 is preferably elongated so that it may be mounted in a wall of the battery or fluid vessel, or in the fluid cap of a battery with an upper end thereof exposed and a lower end thereof projecting downwardly at least to a desired level 13 of liquid 14 within the vessel 10. In this embodiment, an annular member 15 limits the lowermost limit of the combined liquid level indicator and hydrometer 11 within the lowermost level of the liquid and an annular stop 16 or the underneath surface 16', FIG. 2 and FIG. 3 limits the raised position of the liquid level indicator member 12 so that it may be adjusted within the range of the liquid within the container from the lowest to the highest permitted, depending upon the level of the electrolyte. It is within the scope of the invention that suitable seals may be used to prevent leakage of the liquid from within the container and that one of a multiplicity of means may be used for mounting the indicator in a container.

The included angle of the conical tip 17 is 90° and therefore, any light rays passing downwardly through the liquid level indicator member 12 may be received by the conical surface and deflected horizontally to the oppositely disposed portion of the conical surface and then reflected upwardly to the top viewing surface 18. This assumes, however, that the portion of the conical surface receiving and reflecting light rays is not immersed within the liquid of the container 10. It is within the scope of the invention and the skill of one in the art that if other forms of liquid level indicator members are used, the light rays will be transmitted as disclosed and claimed in the aforesaid above-mentioned application and U.S. Patent. Any portion of the conical tip section 17 immersed within the body of the liquid of the container will prevent the reflection of light rays. Hence such portion will be indicated by a complementary shaded portion at the top viewing surface 18.

Referring to FIGS. 1—3, the preferred hydrometer means 19 will be described. The hydrometer means 19 is preferably formed from identical half portions and comprises a hollow body section 20 including a lower body portion for immersion within the liquid and operatively mounted on the aforesaid light-transmitting means or liquid level indicator member 12 by providing an annular portion 21 formed at the upper end of the hydrometer means 19 for operatively engaging an annular recess 22 between the light transmitting means 12 and the conical tip section 17 of the liquid level indicator member 12. The hydrometer means 19 at its bottom end is provided with an inverted conical portion 23 which is provided with an opening 24. A similar inverted conical portion 23' and similarly formed with an opening 24' is provided intermediate the lower inverted conical portion 23 and the conical tip section 17 of the liquid level indicator. These portions provide the inverted conical shaped chambers 25 and 26. The openings 24 and 24' permit the electrolyte or liquid being tested to pass within lower chamber 26 and the upper chamber 25. The polyethylene material from which the hydrometer portion 19 is formed is suitably flexible to permit leakage of air from within the chambers 25 and 26 as the hydrometer means is inserted within the liquid being tested. If desired, suitable holes may be provided within the periphery of the upper chamber walls as will later be described, with reference to the embodiments of FIGS. 4—9. The opening 24' is in axial alignment with the opening 24 permits the electrolyte to flow upwardly into the chamber 25 from the chamber 26. The location of the liquid within the chamber 25 permits the ready determination of the height of the liquid within the container. For example, between low and high.

Referring to FIGS. 2 and 3, a ball float 30 formed from a material having a predetermined known specific gravity is located in the chamber 26 and, in the position shown in FIG. 2, indicates a desired specific density condition in the liquid by the absence of the ball. Preferably the indicating ball float means 30 is colored and may be red, blaze orange or any other desired color to facilitate viewing. With the indicating ball float means 30 in the position shown in FIG. 3, it will also indicate either the low level position of the liquid in the container or the low specific gravity depending on whether the viewing surface 18 is respectively either bright or darkened. Various suitable materials such as polyethylene having the desired specific gravity may be used for making the ball 30.

However, the diameter of the hole 24 is such that the ball 30 may be forced in in the assembly of the ball within the chamber 27, but the resilience of the polyethylene material of the hydrometer means 19 prevents the ball 30 from becoming disengaged from the chamber 27. A hole 24' is of smaller diameter than the hole 24 preventing the ball 30 from rising into the upper chamber 28. The conical portions 23 and 23' forming the substantially parallel and inclined walls permit the ball 30 to rise or fall depending upon the relative specific gravity of the liquid within the chamber 27 and chamber 28.

Although the hydrometer means 19 has been described as being molded from polyethylene material, it is within the scope of the invention and preferable that the hydrometer means 19 may be made from any desired material and may be molded in symmetrical halves and affixed together by suitable adhesive and the ball 30 placed in the lower chamber 27 as the halves are assembled.

Although the embodiment of FIG. 2 has been described with respect to indicating a high specific gravity of the liquid in the container, it is to be understood that with a choice of indicating ball float means of different densities, it will be possible to determine specific gravities of the fluid within the container within the range of low density, medium density and high density. Particular embodiments of such a device will be disclosed and claimed in my copending application Ser. No. 855,917, filed Sept. 8, 1969.

Referring to FIGS. 4—7, another embodiment of the hydrometer means 19' will be described, operatively mounted upon a similarly formed liquid level indicator 12 as previously described above. Referring to FIGS. 5 and 6, the hydrometer means 19' is formed from symmetrical halves of preferably black polyethylene adapted to be hinged together by hinge means 32 to permit the symmetrical halves 31 and 31' to be folded upon each other, and latching means 33 including a male latch member 34 complementarily formed to an opening 35 allow these symmetrical halves 31 to be affixed together. Similar semiannular integrally molded portions 36 provide upper conical surface 37 and lower conical surface 38 when the symmetrical halves are affixed together with an axial opening 39 connecting the lower chamber 27' with the upper chamber 28'. A conical-shaped pin member 40 is formed of the symmetrical half 40'. A ball indicating float means 30 is provided which preferably is formed of brightly colored polyethylene having a diameter such that it floats readily upwardly and downwardly within the annular conical shaped passage formed by conical surface 38 and conical pin 40.

Symmetrically positioned holes 42 may be integrally molded or drilled in the upper chamber 28' to permit the fluid to vent within the hydrometer means 19'. Referring to FIG. 4, the indicating ball float means 30 in the solid position thereof will float to the dotted position 30' when the specific gravity of the fluid under test exceeds that of the indicating ball float means. Holes 43, preferably two in number are diametrically molded or drilled in the bottom of the hydrometer means to permit fluid under test within the container to flow within the lower chamber 27' and within the upper chamber 28'. If it is desired to drain the chambers of the hydrometer means of the hydrometers shown in FIGS. 1—7 and also in the embodiment of FIGS. 8 and 9, the liquid level indicating member 12 may be raised so that the hydrometer means 19 will stop for example against the annular stop 16.

Referring to FIG. 8 and FIG. 9, a modified hollow body section 20'' from that of the embodiment of FIGS. 4—7 will be described and similar reference characters will indicate the same or similar parts. FIG. 8 illustrates one half of the hydrometer means 19'' having the symmetrical halves thereof affixed together by a suitable adhesive. The semiannular sections 36' provide the upper conical surface 37' and the lower conical surface 38'. The conical-shaped pin member 40 and its conical-shaped surface 41 are provided by the symmetrical half portions as shown in FIG. 9.

The semiannular members 36' provide an annular opening 39 with the halves affixed together. Similarly positioned holes 42 may be provided in the upper chamber 28' as particularly described with reference to FIG. 4, FIG. 5 and FIG. 6 by drilling or molding. Referring to FIG. 9, semicircular openings 43' diametrically positioned as shown may be integrally molded within the bottom of the semicircular half portions of the hydrometer means 19'' as illustrated in FIG. 9. It is also within the scope of the invention that the holes 43 diametrically positioned may be drilled in place when the halves are affixed together rather than being molded therein. As described with reference to FIGS. 4—7, the holes 43 provide circulation of the fluid being tested into the lower chamber 27' and through the opening 39 into the chamber 28', and the holes 42 in the upper chamber 28' provides venting of any entrapped air within the hydrometer means 19''.

Before the semicircular half portions of the hydrometer means 19'' are affixed together in the assembly thereof upon the liquid level indicating member 12, an indicating ball float means 30 is placed within the lower chamber 27', and upon affixing by gluing or utilizing other suitable adhesive means, the annular portion 21'' are properly affixed within the annular means 22'' in the form of a groove of the light transmitting member of the liquid level indicator member 12. With the ball indicating means 30 in the position as shown in FIG. 8 there is indicated a low specific gravity condition of the liquid being tested by the absence of the ball as described with reference to the position of the ball in FIG. 4 and in FIG. 2. The conical-shaped surface 41 of the conical-shaped pin member 40 together with the spaced conical-shaped surface 38' provide an annular, substantially conical-shaped passage permitting the indicating ball float means 30 to rise to the dotted position 30' of FIG. 4 as the specific gravity of the fluid increases to correspond, for example, to the specific density of the indicating ball float means 30.

Referring to FIGS. 3, 4 and 8 of the several embodiments of the hydrometer means, in the low level position of the combined liquid level indicator and hydrometer of FIG. 3, the indicator would be totally reflective with the ball 30 shown as an indistinct image having the color of the indicating ball 30. Considering FIGS. 4 and 8 with the combined liquid level indicator and hydrometer in its lowermost position at substantially the low level of the fluid being tested and in which a slight amount of fluid may cover the surface of the hydrometer means about the conical-shaped pin member 40, the conical surface 41 is illuminated and is visible at the top surface 18 of the liquid level indicator, whereas in FIG. 3 the lowermost level of the fluid within the container is indicated by an illuminated image of the indicating ball float means 30. It is also to be understood that one may utilize one or more ball indicating means as particularly disclosed and claimed in my copending application Ser. No. 855,917, filed Sept. 8, 1969.

In general it may be state with respect to the embodiments disclosed herein that when the liquid level of the battery or radiator with which the indicator is utilized, covers the end of the indicator, one will get a normal black or darkened pattern at the upper end of the liquid level indicator. If the specific gravity is low, for example as described with reference to FIG. 2 or FIG. 3, the brightly colored ball will not float and will drop down and be visible at the end of the indicator. However in the embodiments of FIGS. 4—9, the brightly colored ball will not float and will drop down to the nonvisible position for example as shown in FIG. 4 and FIG. 8 and one will obtain a normal black or darkened pattern at the upper end of the conical-shaped surface 41. Thus, in the first embodiment, the presence of the color ball 30 serves as a warning of low specific gravity while in the second and third embodiments, the absence of the ball serves as the warning means.

From the foregoing, it will be apparent that the present invention enables the production of a simple form of combined liquid level indicator and hydrometer, utilizing suitable materials such as acrylic resins for the light indicating means of the liquid level indicator, and polyethylene for the hydrometer means. The present invention also makes it possible to employ relatively thin sections of plastic material for the body portion of the hydrometer means. The several embodiments as disclosed particularly with respect to the light indicating means of the liquid level indicator and the body portion of the hydrometer means may be economically and readily fabricated.

While preferred embodiments of the present invention have been shown and described herein, it is obvious that many structural details may be changed without departing from the spirit and scope of the appended claims.

The invention I claim as follows:

1. A combined liquid level indicator and hydrometer comprising a light transmitting member having an outer indicating surface and reflector surface means adapted to be submerged in liquid for reflecting light to the indicating surface when the liquid is below a predetermined level, chamber means comprising an upper means and a lower means, the upper means connected with said member and the lower means defining a chamber which is connected to said upper means and having access means of a predetermined size in alignment with said member and positioned for submersion in said liquid, and a float larger than said predetermined size and of predetermined specific gravity captured in said lower chamber and movable between upper and lower positions in accordance with the relative specific gravity of the liquid, said chamber means including means for locating said float in one of said positions adjacent said access means for viewing the float through said indicating surface and for locating said float in the other of said positions for obscuring the float from view.

2. A combined liquid level indicator and hydrometer means as set forth in claim 1, wherein the chamber means comprises spaced substantially parallel and inclined walls symmetrically disposed about the axis of said indicator member and said chamber means between which the indicating ball float means is operatively mounted for indicating the specific gravity of the liquid.

3. A combined liquid level indicator and hydrometer means as set forth in claim 1, wherein the walls of the chamber means are inclined vertically permitting the ball float means to be guided vertically upwardly and downwardly through the liquid in the chamber means.

4. A combined liquid level indicator and hydrometer means as set forth in claim 1, wherein the walls of the chamber means are downwardly inclined and conically shaped and vertically spaced apart and between which the indicating ball float means is operatively mounted.

5. A combined liquid level indicator and hydrometer means as set forth in claim 1, wherein the chamber means is formed in symmetrical halves and affixed together.

6. A combined liquid level indicator and hydrometer means as set forth in claim 1, wherein the chamber means is provided by symmetrical halves, hinge means for mounting the symmetrical halves, and latching means for affixing the symmetrical halves together.

7. A combined liquid level indicator and hydrometer means as set forth in claim 1, wherein the chamber means is formed in symmetrical halves, and latching means for affixing the symmetrical halves together comprising a latching pin formed on one half and the other half provided with a complementary opening to receive the latching pin.

8. A combined liquid level indicator and hydrometer means as set forth in claim 1, wherein the chamber means and the member of light transmitting means are complementally formed for affixing together, said light transmitting means comprising an annular recess and a conical-shaped member for mounting within the chamber means, and said chamber means formed with an annular lip complementary to the annular recess of the light transmitting means for affixing the chamber means and the light transmitting means together.

9. A combined liquid level indicator and hydrometer means as set forth in claim 1, wherein the light transmitting means is complementary to an opening provided in the casing in which the liquid level indicator and hydrometer are operatively mounted, and support means formed on the light transmitting means to position the liquid level indicator and hydrometer operatively within the liquid.